United States Patent [19]

Cryar, Jr.

[11] 4,016,931
[45] Apr. 12, 1977

[54] METHOD OF FORMING A CONSOLIDATED GRAVEL PACK

[75] Inventor: Herbert B. Cryar, Jr., Keithville, La.

[73] Assignee: The Dow Chemical Company, Midland, Mich.

[22] Filed: Apr. 22, 1976

[21] Appl. No.: 679,263

[52] U.S. Cl. .............................. 166/276; 166/294; 166/295; 166/305 R

[51] Int. Cl.² ................ E21B 33/138; E21B 43/04

[58] Field of Search .......... 166/276, 278, 285, 294, 166/295, 300, 305 R; 106/209

[56] References Cited

UNITED STATES PATENTS

| | | | |
|---|---|---|---|
| 3,123,138 | 3/1964 | Robichaux | 166/295 |
| 3,339,633 | 9/1967 | Richardson | 166/295 |
| 3,511,315 | 5/1970 | Millhone et al. | 166/295 |
| 3,615,794 | 10/1971 | Nimerick | 106/209 X |
| 3,757,864 | 9/1973 | Crawford et al. | 166/308 |
| 3,760,880 | 9/1973 | Dollarhide | 166/276 |
| 3,763,934 | 10/1973 | Coulter, Jr. et al. | 166/295 X |
| 3,800,847 | 4/1974 | Rike | 166/276 X |
| 3,854,533 | 12/1974 | Gurley et al. | 166/276 |
| 3,867,986 | 2/1975 | Copeland | 166/276 |
| 3,967,681 | 7/1976 | Curzon | 166/295 X |
| 3,983,941 | 10/1976 | Fitch | 166/276 |

Primary Examiner—Stephen J. Novosad
Assistant Examiner—George A. Suchfield
Attorney, Agent, or Firm—Glenn H. Korfhage; Bruce M. Kanuch

[57] ABSTRACT

A permeable consolidated gravel pack is placed in a borehole adjacent an incompetent formation by first emplacing a self-breaking gel in the formation to temporarily plug the formation, and then injecting a slurry of treated particulate matter, e.g. resin coated sand, to form the consolidated gravel pack. The method is particularly useful for the treatment of incompetent formations having unusually low pressures and high permeabilities.

17 Claims, No Drawings

METHOD OF FORMING A CONSOLIDATED GRAVEL PACK

BACKGROUND OF THE INVENTION

1. Field of the Invention

The invention relates to a method of treating a well penetrating an unconsolidated formation from which detritus is carried into the well with produced fluids, i.e., a well penetrating a formation referred to in the art as being "incompetent".

2. Description of the Prior Art

Production of detritus from unconsolidated, i.e., incompetent, subterranean formations producing valuable fluids, such as production of sand from an incompetent sand stone formation, is an ever present problem, particularly in the petroleum industry. A good discussion of the problem, and of the various techniques used to minimize concurrent production of such detritus, can be found in an eight part series by George O. Suman, Jr., appearing in *World Oil* from November, 1974 through June, 1975. The series was published in 1975 as a reprint by Gulf Publishing Company under the title "World Oil's Sand Control Handbook". Three commonly used methods are (1) gravel packing, (2) plastic in situ consolidation, and (3) consolidated packing with a particulate material, often called consolidated gravel packing especially where the particulate material is sand. The latter two methods are discussed in Part 7 of said Handbook, the teachings of which are expressly incorporated herein.

Generally, in forming a consolidated pack of particulate material, a slurry containing a carrier fluid, particles of the solid material, and at least one adhesive-forming composition, such as a resin, for permeably but stably adhering the particles together is injected into the borehole. The slurry may contain complete means for permeably but stably adhering the particles to one another, as where the adhesive-forming composition requires no chemical activator such as a curing agent or catalyst, or where any necessary activator is also provided as part of the slurry. Alternatively, where the adhesive-forming composition must be chemically activated and the activator is not provided in the slurry, the prior art has provided the activator in an injection either immediately before, or immediately after, injection of the slurry.

Although the art of forming consolidated packs of particulate material has advanced considerably over the past 20 years or so, the prior art methods are not always completely satisfactory for the job at hand. For example, strong, long lasting gravel packs could not be obtained with consistency adjacent incompetent formations having a relatively high porosity and low pressure by previously known methods as heretofore practiced.

A separate art in the treatment of wells relates to the use of temporary self-breaking plugs. The temporary plug is formed from a fluid which forms a gel. The fluid may be one from which a gel is formed at the surface of the earth and the gel is then pumped into the formation under relatively high pressures, or, the fluid may be of a type which reaches its maximum viscosity after injection into the borehole. In either case, after a period of time sufficient to carry out additional treatment of the well, the gel breaks so that the remains of the gel can readily be removed from the formation. An example of such a system is taught by Nimerick in U.S. Pat. No. 3,615,794. Such a temporary plug has been used in penetrating formations having zones of different permeabilities to divert a subsequent well treatment fluid of lower viscosity into less permeable zones to thereby obtain more uniform treatment of the formation, e.g., in conjunction with fracturing, water flooding, or acidizing.

In the context of sand control, a temporary plug has been used with plastic in situ consolidation in the conventional sense, i.e., as a diverter. See Smith, U.S. Pat. No. 3,250,330 at columns 11 and 12. Robichaux, U.S. Pat. No. 3,123,138 teaches to use a temporary plug in conjunction with plastic in situ consolidation following, rather than preceding, injection of the resin to cause a sharp increase in pressure at the well head when the plug reaches the formation, thereby signaling when all of the resin has entered the formation.

SUMMARY OF THE INVENTION

The present invention is a novel method for providing a permeably consolidated packing of a particulate material in a borehole to prevent detritus from a surrounding incompetent formation from entering the borehole. The method is particularly adapted for use wherein prior to application of the method, the formation is so permeable and of such low pressure that a conventional slurry of the consolidated-particulate-mass-forming type, containing a fluid carrier, particles of a solid material, and means for causing the particles to permeably but stably adhere to one another to form a consolidated particluate pack, cannot be supported in the borehole to a height at least as high as the most shallow point at which detritus from the formation can enter the borehole (hereinafter referred to as "critical height") for a sufficient time to permit the particles in the slurry to permeably but stably adhere to one another to form the desired consoliated pack (hereinafter referred to as "minimum effective time").

The method comprises emplacing in the formation via the borehole, a conventional gel of the self-breaking type which is effective to adequately temporarily plug the formation to permit a head of the slurry of the type hereinabove referred to to be supported to at least the critical height for at least the mimimum effective time; filling said borehole with said slurry to a height at least as high as the critical height; permitting the particles to adhere to one another; and permitting the gel to break.

Use of the temporary plug according to the present invention, not as a diverting means, but rather as means for forming a temporary foundation against which the permanent consolidated particulate pack can be formed, permits consistently successful placement of such a conventional pack in wells where attempts to place such a pack without using a temporary plug would fail or at best be only of marginal or temporary success.

DETAILED DESCRIPTION OF THE INVENTION

The present invention may be employed to place a consolidated gravel pack wherever detritus from an unconsolidated formation is entering the borehole, whether it be through open hole at the lower end of the borehole, i.e., where there is no casing or liner, or whether it be through perforations in a casing or liner at an intermediate level in the well, or both. In situations where the detritus to be controlled is entering below the last string of casing or liner only, then the bottom of the last string will mark the critical height, unless the string ends in a stratum of consolidated formation above the unconsolidated formation, in which case the interface between the two formations is the critical height. Where detritus is entering through perforations, the level of the highest perforation opening to the unconsolidated formation is the critical height even though outside the casing, the incompetent formation may extend above the last perforation.

The novelty of the present invention lies neither in the particular composition of the temporary plug nor in that of the slurry, but rather in the unique cooperative way in which any temporary self-breaking gel type plug is employed in combination with any slurry of the consolidated particulate-mass-forming type.

For brevity, such slurries are hereinafter referred to as consolidated gravel pack slurries, and the resulting pack, a consolidated gravel pack, though it is to be understood the particulate material in the slurry may be any of those commonly employed in such slurries. In lieu of sand or gravel, the particulate material may be walnut hulls or other nut shells, synthetic resins, coke, glass beads, fruit pits, particulate metals, or the like, and mixtures thereof. Similarly, the size of the particles is not critical. Depending on the particular consolidated gravel pack slurry system selected for use in any given application of this invention, however, certain particulate material may be preferred and even essential, and a particular range of particle sizes may also be called for, but it is within the ability of those skilled in the art to select a suitable particulate based on teachings of the prior art. For example, a specific particle size is called for at column 3, line 61 by Copeland in the consolidated gravel pack slurry described in his U.S. Pat. No. 3,878,893, but in the slurry disclosed by Dollarhide in U.S. Pat. No. 3,760,880, the particle size is not critical (column 1, line 60).

The consolidated gravel pack slurry must contain a means for causing the particles of particulate material to permeably but stably adhere to one another. Known resins which have been used for this purpose include phenol-aldehyde resins such as phenol-formaldehyde resins, polyesters such as a polymer of a polyhydric alcohol and a polybasic acid modified with a vinyl monomer, urea-formaldehyde resins, epoxy resins, phenol-urea resins, phenol-melamine resins, furfural alcohol resins, and the like. To effectively function as a means for causing the particles to permeably but stably adhere to one another within a practical period of time, many resins require an accelerator of some type, i.e., a catalyst or curing agent, such as certain bases, amines, or strong organic acids. In some conventional consolidated gravel packing methods, it is taught that the accelerator, if needed, may be injected before, after, or in, the slurry. In the practice of the present invention, however, any accelerator employed should be provided in the slurry itself to assure the particles are uniformly adhered to one another throughout the entire depth of consolidated gravel pack, since excessive flushing could cause damage to the temporary plug.

The third essential component of the consolidated gravel pack slurry is a suitable carrier fluid, such as kerosene, diesel oil, brightstock, crude oil, or any other inert hydrocarbon liquid which does not adversely affect the resin coated particulate. Water based carrier fluids such as brine may also be employed with compatible resin systems.

The slurry may also optionally contain a means, commonly known as a coupling agent, for enhancing the bond between the particulate material and the resin. Suitable coupling agents for sand, for example, are taught by Walther et al. in U.S. Pat. No. 3,285,339.

Particularly for the purpose of illustrating representative consolidated gravel pack slurries suitable for use herein and/or resin systems which can be employed in combination with a particulate and a carrier fluid to make slurries suitable for use herein, and without limiting the scope of this invention to the scope of respective disclosures in the references cited, the teachings of the following references, including the teachings of any reference incorporated therein, are expressly incorporated herein:

"World Oil's Sand Control Handbook", hereinabove cited, Part 7;

|  | Henderson et al. | U.S. Pat. No. 2,823,753; |
|---|---|---|
|  | Treadway et al. | U.S. Pat. No. 3,176,769; |
|  | Walther et al. | U.S. Pat. No. 3,285,339; |
|  | Hilton, Jr., et al. | U.S. Pat. No. Re. 25,747; |
|  | Pavlich et al. | U.S. Pat. No. 3,310,111; |
|  | Dollarhide | U.S. Pat. No. 3,760,880 |
|  | Gurley et al. | U.S. Pat. No. 3,854,533; |
|  | Copeland | U.S. Pat. No. 3,857,444; |
|  | Copeland | U.S. Pat. No. 3,867,986; |
| and | Copeland | U.S. Pat. No. 3,878,893. |

As is apparent from the foregoing patents, resins of the epoxy type or the phenol-aldehyde type are most frequently preferred by those skilled in the art.

Similarly, many approaches are known in the art for emplacement of a temporary plug in a porous formation. In one embodiment, for example, a temporary plug may be emplaced by injecting either a viscous oil-based or viscous water-based pumpable gel into the borehole and thence into the formation. The gel must be self-breaking after a predetermined time under the conditions present in the unconsolidated formation, which time must be at least as long as the time required to place the gel, the consolidated gravel pack slurry, and permit the particles in the slurry to permeably but stably adhere to one another. If necessary, the gel may include a known breaking agent to achieve the proper breaking properties. The viscosity of the pumpable gel is not critical, except that it must be sufficiently low so that it can be pumped into the formation at less than fracturing pressures, yet sufficiently high, at the formation temperature, that once emplaced, it is not appreciably moved through the formation under the pressure exerted by the head of consolidated gravel pack slurry which must be maintained in the borehole at least as high as the critical height. The pressure exerted by a given head of slurry will, of course, vary somewhat depending on the density of the particular slurry employed.

Where compatible with the formation, it is generally preferred to use a water-based gel or gellable fluid because of ease of handling, relative lack of safety hazards, ready availability, cost, and the like. It is known, however, that aqueous fluids can cause formation damage where, for example, the formation has a high clay content. In treating such formations, therefore, an oil-based self-breaking gel is recommended. A preferred oil-based gel containing a breaker is that described by Crawford et al. in U.S. Pat. No. 3,757,864, the teachings of which are expressly incorporated herein. The upper limit on the viscosity of the gel which can be used, as determined by pumpability of the gel, is significantly greater with the gel described in said patent than with most other gelled oils because of the low friction properties of said gel.

To reduce pumping pressure, it is preferable to emplace the temporary plug in the formation by injecting into the formation via the borehole, a fluid of the type containing a gelling quantity of at least one additive selected so that the fluid attains its greatest viscosity after injection into the borehole, forms a temporary plug which adequately temporarily reduces the permeability of the formation by remaining in the formation as a gel for a time sufficient to permit the necessary additional treatment of the formation, and thereafter breaks to permit removal of said fluid after it has performed its function.

Particularly for the purpose of illustrating representative delayed gelling action, self-breaking fluids suitable for use herein, but without limiting the scope of this invention to the scope of the respective disclosures in the references cited, the teachings of the following references, including the teachings of any references incorporated therein, are expressly incorporated herein:

|   | Eilers et al. | U.S. Pat. No. 3,611,733; |
|---|---|---|
|   | Nimerick | U.S. Pat. No. 3,615,794; |
|   | Nimerick | U.S. Pat. No. 3,740,360; |
|   | Coulter et al. | U.S. Pat. No. 3,743,613; |
|   | Coulter et al. | U.S. Pat. No. 3,763,934; |
|   | Nimerick | U.S. Pat. No. 3,766,984 |
| and | Nimerick | U.S. Pat. No. 3,779,914. |

Most preferred is an aqueous gellable fluid containing hydroxyethylcellulose as the gelling agent, such as that hereinafter described in the example. Such plugs tend to leave even less residue in the formation after breaking than do some of the galactomannan-thickened fluids mentioned in the foregoing patents.

As illustrated in the foregoing patents, it is known that by altering the amount(s) of additive(s) in such delayed gelling action fluids, the gelling times and the gel breaking times can be reasonably well, though not perfectly, controlled. Ideally, of course, the fluid would be formulated to gel instantaneously just after it enters the formation. In actual practice, however, the gelling occurs gradually, and some of the injected fluid may be lost so deeply into the unconsolidated formation before gelling adequately progresses that a single step injection of the fluid is not always adequate to form a satisfactory plug. A satisfactory plug can eventually be obtained, however, by injecting the plugging fluid in multiple stages and permitting the injected fluid to gel between each stage, using as many cycles as is necessary to temporarily plug the formation sufficiently so that a head of the consolidated gravel pack slurry can be supported to at least the critical height for the minimum effective time.

It is known in the art to be desirable to use certain spacers and/or preflushes with many of the consolidated gravel pack slurries, e.g., to insure that the borehole is free from contaminants which might otherwise interfere with the reaction of the slurry components in forming the consolidated gravel pack. Such spacers and/or preflushes may be employed in the present invention between emplacement of the temporary plug and injection of the consolidated gravel pack slurry, if desired, provided these fluids are selected so as not to be detrimental to the particular set gel employed for the temporary plug. Although the unconsolidated formation is sufficiently plugged to support a head of the consolidated gravel pack slurry to the critical height for the minimum effective time, it is usually nevertheless still sufficiently porous so that spacer fluids and even the slurry itself can be slowly injected into the formation under moderate pressure. The rate of injection and pressure at the formation face should be sufficiently low so as not to significantly displace the gel or fracture the formation.

Following injection of any desired spacer or preflush as hereinabove described, a sufficient amount of the consolidated pack slurry is injected into the borehole to fill the borehole to at least the critical height. In a preferred embodiment, sufficient slurry is employed so that a portion, e.g., from about 25 to about 75 percent by volume of the total slurry employed, can be slowly injected into the formation under moderate pressure, e.g., under low pumping pressure or under a head of trailing spacer, water, brine, or the like, with a sufficient volume of slurry still remaining in the borehole to fill the borehole to at least the critical height. The borehole may be shut in not only after filling the borehole to the critical height, but also, if desired, after filling the borehole to a height above the critical height. Some settling of the slurry in the borehole, e.g., by seepage into the formation, can be tolerated so long as (1) the rate of settling is not so rapid as to inhibit or otherwise interfere with the process whereby the particles in the slurry permeably but stably adhere to one another and (2) the slurry does not settle to a level below the critical height within the minimum effective time. Accordingly, in actual practice, the borehole is customarily filled with slurry to a height slightly, e.g., several feet, above the critical height as a precaution as against the possibility that some settling may occur.

The practice of the present invention is further illustrated by the following example based on an actual well treatment.

EXAMPLE

The process of the present invention was used successfully to place a consolidated gravel pack in a reworked oil well in Ouachita County near Smackover, Arkansas, where a number of prior attempts to place a consolidated gravel pack without using the temporary plug step had been unsuccessful.

A borehole having a total depth of about 2177 feet contained a casing perforated at depth of from 1977 feet through 2016 feet, adjacent an unconsolidated formation which was of such porosity and inadequate pressure that a head of conventional consolidated gravel pack slurry could not be maintained in the borehole to the height of the most shallow perforations in the casing for a sufficient time for the particles in such a slurry to permeably but stably adhere to one another. The well also contained tubing within the casing extending to 1950 feet, and packer at a depth of 1510 feet.

A water-based gellable fluid was prepared by admixing, per 1000 gallons of fresh water: 500 pounds of Natrosol 250 HHR brand of hydroxyethylcellulose; 20 pounds of a buffer comprised of, by weight, 44 percent citric acid and 56 percent sodium carbonate; and 0.25 pound of Cellase 4 Tech brand enzyme breaker.

Immediately after mixing, 500 gallons of the foregoing fluid was pumped into the borehole and was displaced into a formation using 12 barrels of lease oil.

After waiting one hour for the first injection to gel, a second 500 gallons of a freshly prepared batch of the water-based fluid was injected into the borehole and displaced into the formation in a similar manner. After waiting another hour for the second slug of gellable fluid to set, two spacers were injected, the first, two barrels of diesel oil and the second, three barrels of bright stock, i.e., a mineral oil, containing 1 percent by volume of a surfactant (hereinafter referred to as "composite surfactant") consisting essentially of, by weight, about 20 percent sodium di(2-ethylhexyl)sulfosuccinate, about 60 percent an ethoxylated fatty acid, about 5 percent each of 2 propanol and water, and about 10 percent 2-ethyl-1-heptanol.

A batch of a slurry having a density of about 13.5 pounds per gallon was prepared comprising, per ten barrels of slurry:
- 210 gallons of a brightstock oil such as that used above for the spacer following the diesel oil spacer, except including 0.5 weight percent, rather than 1 percent, of the composite surfactant;
- 3750 pounds of 0.42–0.841 millimeter (20/40 mesh U.S. Sieve Series) sand;
- 3 gallons of gamma-aminopropyltriethoxysilane coupling agent;
- 32 gallons of a blend of, by weight
  - 60 percent a standard low-molecular weight resin of the bis-phenol-A/epichlorohydrin type,
  - 10 percent ethylene glycol n-butyl ether, and
  - 30 percent amyl acetate, technical grade; and
- 50 pounds of p,p'-methylenedianiline, a curing agent for the epoxy resin;

with the resin blend and curing agent being admixed with one another just prior to addition to remaining components. The slurry was pumped into the well for 13 minutes at an average rate of about three-fourth barrel per minute and substantially no gauge back pressure at the well head. The slurry was displaced by a two-barrel spacer of the brightstock oil containing 1 percent composite surfactant as hereinabove described, a two-barrel spacer of diesel oil, and finally, 3 barrels of brine. The tubing was pulled, thereby permitting the injected slurry to settle to a stable level in the casing, above the perforations. The well was shut in and the resin permitted to set. It was thereafter determined a consolidated gravel pack had been successfully formed. Production was resumed by the lease operator at a later date after a portion of the consolidated gravel pack had been removed by drilling according to conventional practice, as in, for example, Gurley et al., U.S. Pat. No. 3,854,533. The produced fluids were found to be free from sand. Only slight drawdown in formation pressure was observed, thereby indicating that the temporary gel plug had indeed broken as planned, and that the emplaced consolidated gravel pack was porous to fluids, resulting in successful sand control with substantially no serious damage to the formation.

What is claimed is:

1. A method for providing a permeably consolidated particulate mass adjacent a subterranean formation surrounding a borehole penetrating the formation, wherein prior to treatment, the formation is characterized as being incompetent, permeable, and of insufficient pressure, to support a head of
   a slurry of the consolidated-particulate-mass-forming type, containing a fluid carrier, particles of solid material, and a means for causing said particles to permeably but stably adhere to one another to form a consolidated particulate pack,
   at least as high as the critical height, said critical height meaning the most shallow depth at which detritus from said formation can enter the borehole, for at least the minimum effective time sufficient to permit said particles in the slurry to permeably but stably adhere to one another, comprising:
   a. emplacing in the formation via the borehole, a gel of the self-breaking type, said gel being effective to adequately temporarily plug the formation to permit a head of said slurry to be supported to at least the critical height for at least the minimum effective time;
   b. filling said borehole with said slurry to a height at least as high as the critical height;
   c. permitting said particles to permeably but stably adhere to one another to form a consolidated particulate pack; and
   d. permitting said gel to break.

2. The method of claim 1 wherein the gel is a water-based gel.

3. The method of claim 1 wherein the gel is an oil-based gel.

4. The method of claim 1 wherein at least one spacer fluid is injected into the borehole after injecting the components of the temporary plug, but prior to filling said borehole with said slurry.

5. The method of claim 1 wherein the slurry contains a coupling agent for enhancing the effectiveness of the means for causing said particles to permeably but stably adhere.

6. The method of claim 1 wherein the means for causing said particles to permeably but stably adhere comprises a resin requiring a chemical accelerator to be effective, and an accelerator for said resin.

7. The method of claim 1 wherein a portion of the total slurry employed is injected into the formation.

8. The method of claim 7 wherein after injecting a portion of the slurry into the formation, the borehole is shut in with the level of the slurry greater than the critical height.

9. The method of claim 1 wherein the borehole is shut in containing slurry in said borehole to a height greater than the critical height.

10. The method of claim 1 wherein step (a) comprises
    a'. injecting into the formation via the borehole, fluid of the type which (i) contains a gelling quantity of at least one additive selected so that the fluid attains its greatest viscosity after injection into the borehole, (ii) forms a temporary plug by remaining in the formation as a gel for a time sufficient to permit additional treatment of the formation, and (iii) thereafter breaks to permit removal of said fluid after it has performed its function; and
    a''. permitting said fluid to set as a gel; said steps a' and a'' being carried out as often as is necessary to adequately temporarily plug the formation.

11. The method of claim 10 wherein the fluid injected into the borehole is a water-based fluid.

12. The method of claim 11 wherein the fluid contains a gelling quantity of hydroxyethylcellulose.

13. The method of claim 1 wherein, in the slurry, the means for causing includes a resin selected from the group consisting of phenol-aldehyde resins and epoxy resins.

14. The method of claim 13 wherein said slurry contains a coupling agent for enhancing the effectiveness of said resin in causing said particles to permeably but stably adhere.

15. The method of claim 13 wherein the resin is an epoxy resin.

16. The method of claim 15 wherein step (a) comprises:

a' injecting into the formation via the borehole, a water-based fluid of the type which (i) contains a gelling quantity of at least 1 additive selected so that the fluid attains its greatest viscosity after injection into the borehole, (ii) forms a temporary plug by remaining in the formation as a gel for a time sufficient to permit additional treatment of the formation, and (iii) thereafter breaks to permit removal of said fluid after it has performed its function; and a'' permitting said fluid to set as a gel; said steps a' and a'' being carried out as often as is necessary to adequately temporarily plug the formation.

17. The method of claim 16 wherein the fluid contains a gelling quantity of hydroxyethylcellulose; wherein at least one spacer fluid is injected into the borehole after said temporary plug has been formed, but prior to filling said borehole with said slurry; wherein said slurry contains sand as the particles of solid material, a blend of a bisphenol-A/epichlorohydrin type epoxy resin, ethylene glycol n-butyl ether, amyl acetate, and p,p'-methylenedianiline as the means for causing, and gamma-aminopropyltriethoxysilane as a coupling agent for enhancing the effectiveness of said means for causing; wherein a portion of the total slurry employed is injected into the formation; and wherein the borehole is shut in with the slurry at a level above the critical height.

* * * * *